(12) United States Patent
Quach et al.

(10) Patent No.: US 10,502,065 B2
(45) Date of Patent: Dec. 10, 2019

(54) GAS TURBINE ENGINE COMPONENT WITH RIB SUPPORT

(71) Applicant: UNITED TECHNOLOGIES CORPORATION, Farmington, CT (US)

(72) Inventors: San Quach, East Hartford, CT (US); Tracy A. Propheter-Hinckley, Manchester, CT (US); Matthew A. Devore, Cromwell, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 660 days.

(21) Appl. No.: 14/896,730

(22) PCT Filed: Jun. 6, 2014

(86) PCT No.: PCT/US2014/041222
§ 371 (c)(1),
(2) Date: Dec. 8, 2015

(87) PCT Pub. No.: WO2015/020720
PCT Pub. Date: Feb. 12, 2015

(65) Prior Publication Data
US 2016/0130950 A1 May 12, 2016

Related U.S. Application Data

(60) Provisional application No. 61/835,731, filed on Jun. 17, 2013.

(51) Int. Cl.
*F01D 5/18* (2006.01)
*B22C 9/10* (2006.01)
(Continued)

(52) U.S. Cl.
CPC .............. *F01D 5/186* (2013.01); *B22C 9/103* (2013.01); *F01D 5/187* (2013.01); *F01D 9/041* (2013.01);
(Continued)

(58) Field of Classification Search
CPC .......... F01D 5/186; F01D 5/187; F01D 5/147; F01D 5/18; F01D 25/12
See application file for complete search history.

(56) References Cited

U.S. PATENT DOCUMENTS 3,957,391 A 5/1976 Vollinger
4,411,597 A 10/1983 Koffel et al.
(Continued)

FOREIGN PATENT DOCUMENTS

WO 2015060973 4/2015

OTHER PUBLICATIONS

International Search Report and Written Opinion of the International Searching Authority for International application No. PCT/US2014/041222 dated Feb. 6, 2015.
(Continued)

*Primary Examiner* — Christopher Verdier
*Assistant Examiner* — Michael L Sehn
(74) *Attorney, Agent, or Firm* — Carlson, Gaskey & Olds, P.C.

(57) ABSTRACT

A component according to an exemplary aspect of the present disclosure includes, among other things, an airfoil that includes a first sidewall and a second sidewall joined together at a leading edge and a trailing edge and extending from a base to a tip. A plenum is defined inside the airfoil. A first cooling cavity merges into the plenum and a second cooling cavity merges into the plenum. A rib extends from at least one of the first sidewall and the second sidewall at least partially into the plenum to separate the first cooling cavity from the second cooling cavity.

19 Claims, 6 Drawing Sheets

(51) Int. Cl.
    *F01D 9/04*       (2006.01)
    *F01D 25/12*     (2006.01)
    *F02C 3/04*       (2006.01)
    *F04D 29/32*     (2006.01)

(52) U.S. Cl.
    CPC ............... *F01D 25/12* (2013.01); *F02C 3/04* (2013.01); *F04D 29/324* (2013.01); *F05D 2220/32* (2013.01); *F05D 2230/211* (2013.01); *F05D 2240/12* (2013.01); *F05D 2240/125* (2013.01); *F05D 2240/30* (2013.01); *F05D 2240/307* (2013.01); *F05D 2240/35* (2013.01); *F05D 2260/202* (2013.01); *F05D 2260/22141* (2013.01)

(56) References Cited

U.S. PATENT DOCUMENTS

| | | |
|---|---|---|
| 4,753,575 A | 6/1988 | Levengood et al. |
| 5,511,937 A | 4/1996 | Papageorgiou |
| 5,997,251 A | 12/1999 | Lee |
| 6,126,396 A * | 10/2000 | Doughty ................. F01D 5/187 |
| | | 416/97 R |
| 6,164,914 A | 12/2000 | Correia et al. |
| 6,283,708 B1 | 9/2001 | Zelesky |
| 6,607,355 B2 | 8/2003 | Cunha et al. |
| 6,672,836 B2 | 1/2004 | Merry |
| 6,932,571 B2 | 8/2005 | Cunha et al. |
| 6,971,851 B2 * | 12/2005 | Liang ........................ F01D 5/08 |
| | | 416/1 |
| 7,334,991 B2 * | 2/2008 | Liang ..................... F01D 5/081 |
| | | 416/97 R |
| 8,313,301 B2 | 11/2012 | Hudson |
| 2006/0153680 A1 | 7/2006 | Liang |
| 2007/0189898 A1 | 8/2007 | Hooper et al. |
| 2011/0044822 A1 | 2/2011 | Hada et al. |
| 2014/0030102 A1 | 1/2014 | Mishra et al. |

OTHER PUBLICATIONS

Extended European Search Report for European Application No. 14834595.2 dated Dec. 23, 2016.

\* cited by examiner

GAS TURBINE ENGINE COMPONENT WITH RIB SUPPORT

This invention was made with government support under Contract No. N00019-12-D-0002 awarded by the United States Navy. The Government therefore has certain rights in this invention.

BACKGROUND

This disclosure relates to a gas turbine engine, and more particularly to a gas turbine engine component and a core assembly for defining internal cooling features within a completed component.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, some gas turbine engine components include an internal cooling scheme that routes cooling air through the part. For example, the internal cooling scheme may define multiple hollow passages through which the cooling air may be circulated. Thermal energy is transferred from the component to the airflow as the cooling air passes through the cooling scheme to cool the component.

Some components, such as airfoils, are typically molded parts. The internal cooling passages required to communicate cooling air through the part are typically formed using core assemblies that are over-molded during a casting or other molding process to define the hollow passages inside the component.

SUMMARY

A component according to an exemplary aspect of the present disclosure includes, among other things, an airfoil that includes a first sidewall and a second sidewall joined together at a leading edge and a trailing edge and extending from a base to a tip. A plenum is defined inside the airfoil. A first cooling cavity merges into the plenum and a second cooling cavity merges into the plenum. A rib extends from at least one of the first sidewall and the second sidewall at least partially into the plenum to separate the first cooling cavity from the second cooling cavity.

In a further non-limiting embodiment of the foregoing component, the component is a blade.

In a further non-limiting embodiment of either of the foregoing components, the component is a vane.

In a further non-limiting embodiment of any of the foregoing components, the rib extends across the plenum.

In a further non-limiting embodiment of any of the foregoing components, the rib extends between opposing sides of the plenum.

In a further non-limiting embodiment of any of the foregoing components, the rib extends transversely between the opposing sides.

In a further non-limiting embodiment of any of the foregoing components, the rib defines a surface that constricts a flow of cooling fluid that exits at least one of the first cooling cavity and the second cooling cavity into the plenum.

In a further non-limiting embodiment of any of the foregoing components, a portion of the rib extends from at least one of the first sidewall and second sidewall and terminates prior to the other of the first sidewall and the second sidewall.

In a further non-limiting embodiment of any of the foregoing components, a third cooling cavity merges into the plenum.

In a further non-limiting embodiment of any of the foregoing components, the third cooling cavity exits adjacent to another rib.

In a further non-limiting embodiment of any of the foregoing components, the plenum is positioned in the tip.

In a further non-limiting embodiment of any of the foregoing components, the rib includes a face that is offset from an outlet of at least one of the first cooling cavity and the second cooling cavity.

A gas turbine engine according to an exemplary aspect of the present disclosure includes, among other things, a component disposed in at least one of a compressor section and a turbine section. The component includes a body that includes a first sidewall and a second sidewall joined together at a leading edge and a trailing edge and extending from a base to a tip. The component has an internal cooling scheme comprising a cooling cavity that merges into a plenum and a rib that extends from at least one of the first sidewall and the second sidewall into the plenum to control expansion of a cooling fluid from the cooling cavity into the plenum.

A core assembly for fabricating a component according to an exemplary aspect of the present disclosure includes, among other things, a first core that defines a first cooling cavity of a component and a second core that defines a second cooling cavity of the component. A partial rib extends from the first core and the second core and defines a plenum of the component. At least one cut-out in the partial rib defines a rib in the component.

In a further non-limiting embodiment of the foregoing core assembly, the component is a completed component.

In a further non-limiting embodiment of either of the foregoing core assemblies, a third core defines a third cooling cavity of the component.

In a further non-limiting embodiment of any of the foregoing core assemblies, the partial rib extends from the third core.

In a further non-limiting embodiment of any of the foregoing core assemblies, at least one cut-out includes a plurality of cut-outs disposed on opposing faces of the partial rib.

The various features and advantages of this disclosure will become apparent to those skilled in the art from the following detailed description. The drawings that accompany the detailed description can be briefly described as follows.

DETAILED DESCRIPTION

This disclosure is directed to a gas turbine engine component and a core assembly for defining internal cooling features within a completed component. Among other features, an exemplary cooling scheme may include partial ribs that both structurally transition between a cavity and a plenum and improve effective heat transfer between a cooling fluid and the component. For example, the ribs described herein increase the amount of surface area available for exchanging heat and conduct heat away from the walls of the component. Flow of the cooling fluid is constrained in certain directions by reducing area, thereby maintaining heat transfer coefficients relatively high as the cooling fluid enters the plenum of the component.

Figure 1:
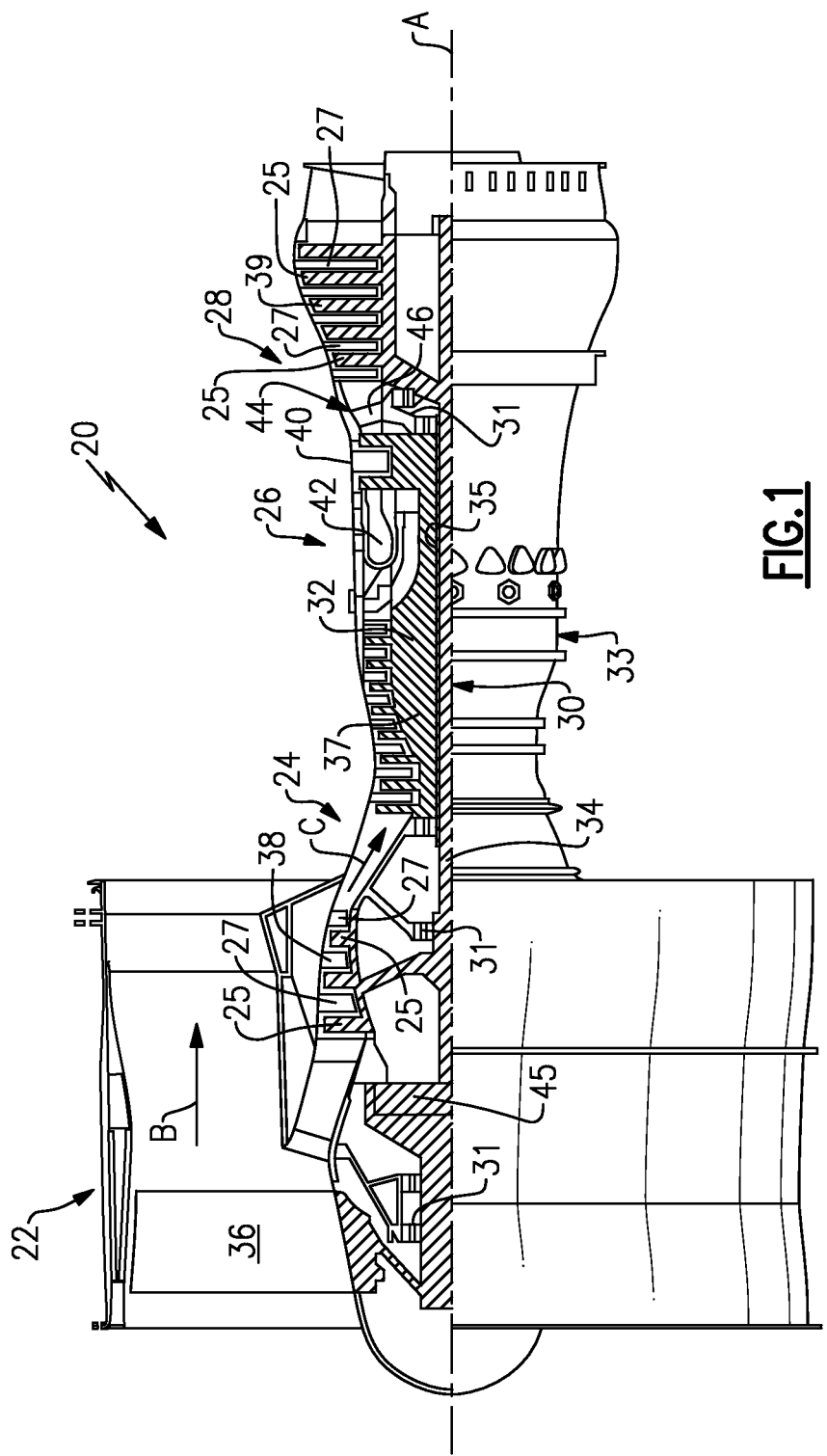
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling schemes for cooling the parts during engine operation.

Figure 2:
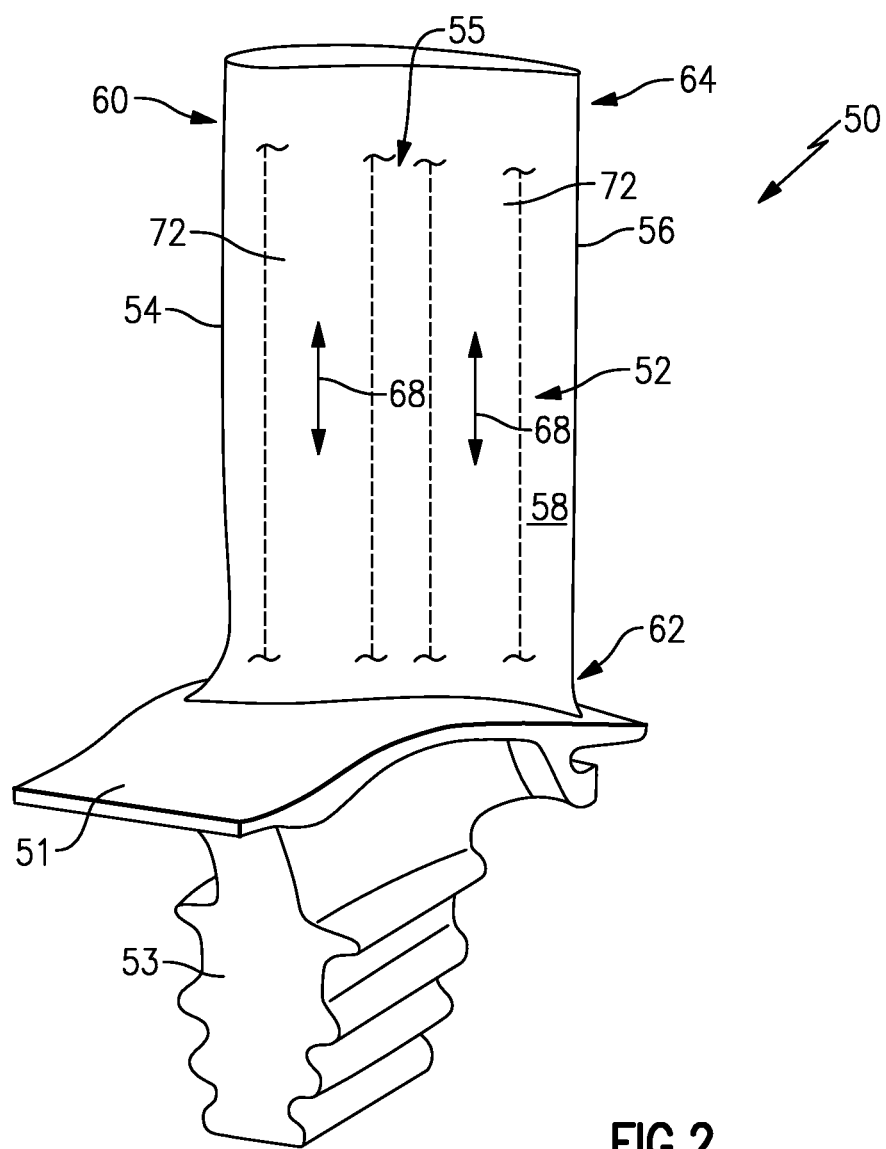
FIG. 2 illustrates a gas turbine engine component.

FIG. 2 illustrates a component 50 that may be employed by a gas turbine engine, such as the gas turbine engine 20 of FIG. 1. The component 50 can be manufactured in a casting or molding process. Exemplary casting processes include investment casting, die casting, other molding processes or additive manufacturing processes. In one embodiment, the component 50 is a turbine blade. However, the features of this disclosure are applicable to any cast part of a gas turbine engine, or any other part, including compressor parts. Rotating structures, vanes or other components may all benefit from the teachings of this disclosure.

The component 50 includes an airfoil 52 (or other body portion) that axially extends between a leading edge 54 and a trailing edge 56. The airfoil 52 may additionally include a pressure sidewall 58 (i.e., a first sidewall) and a suction sidewall 60 (i.e., a second sidewall) that are spaced apart from one another and that join together at each of the leading edge 54 and the trailing edge 56. The component 50 in one embodiment additionally includes a platform 51 and a root 53. The airfoil 52 extends outwardly from the platform 51 and the root 53 extends outwardly in an opposed direction from the platform 51. The airfoil 52 extends from a base 62 adjacent to the platform 51 to a tip 64.

The component 50 may include an internal cooling scheme 55 for cooling the component 50. The internal cooling scheme 55 includes one or more cooling cavities 72 (in this embodiment, two cooling cavities are shown in phantom). It should be appreciated that the component 50 could include additional cooling cavities or only a single cooling cavity. The cooling cavities 72 may be in fluid communication with one another, such as along a serpentine path, or could alternatively be fluidly isolated from one another.

The cooling cavities 72 extend radially, axially and/or circumferentially inside of the airfoil 52 or other sections of the component 50 and establish hollow passages for receiving and circulating a cooling fluid 68, such as relatively cool air from the compressor section 24, to cool the component 50. Although not shown by FIG. 2, the internal cooling scheme 55 may feed various cooling holes disposed through the component 50, including through the airfoil 52, the platform 51, and/or the root 53, to provide a layer of film cooling air at surfaces of the component 50.

Figure 3:
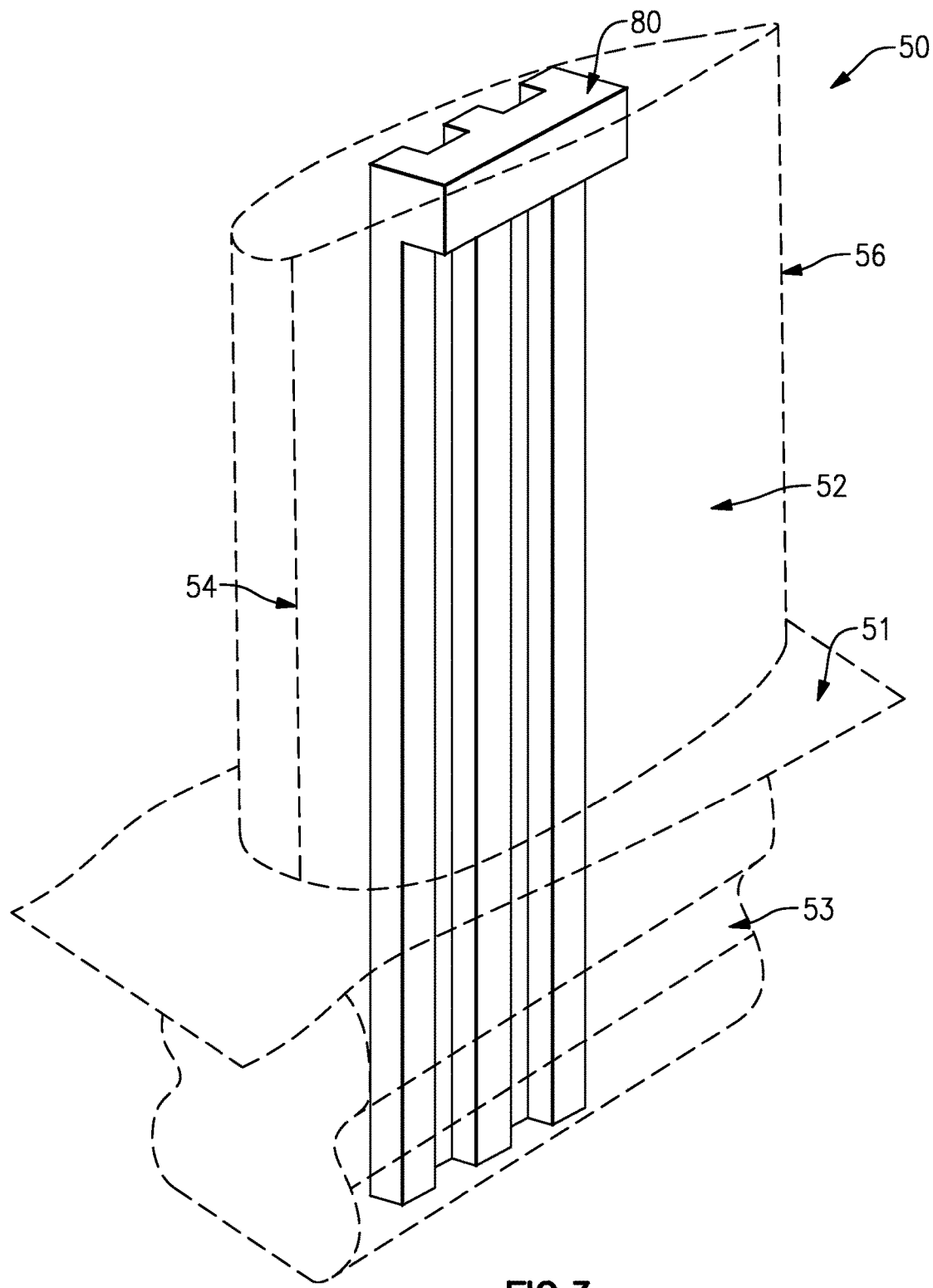
FIG. 3 illustrates a gas turbine engine component prior to removal of a core assembly.
Figure 4:
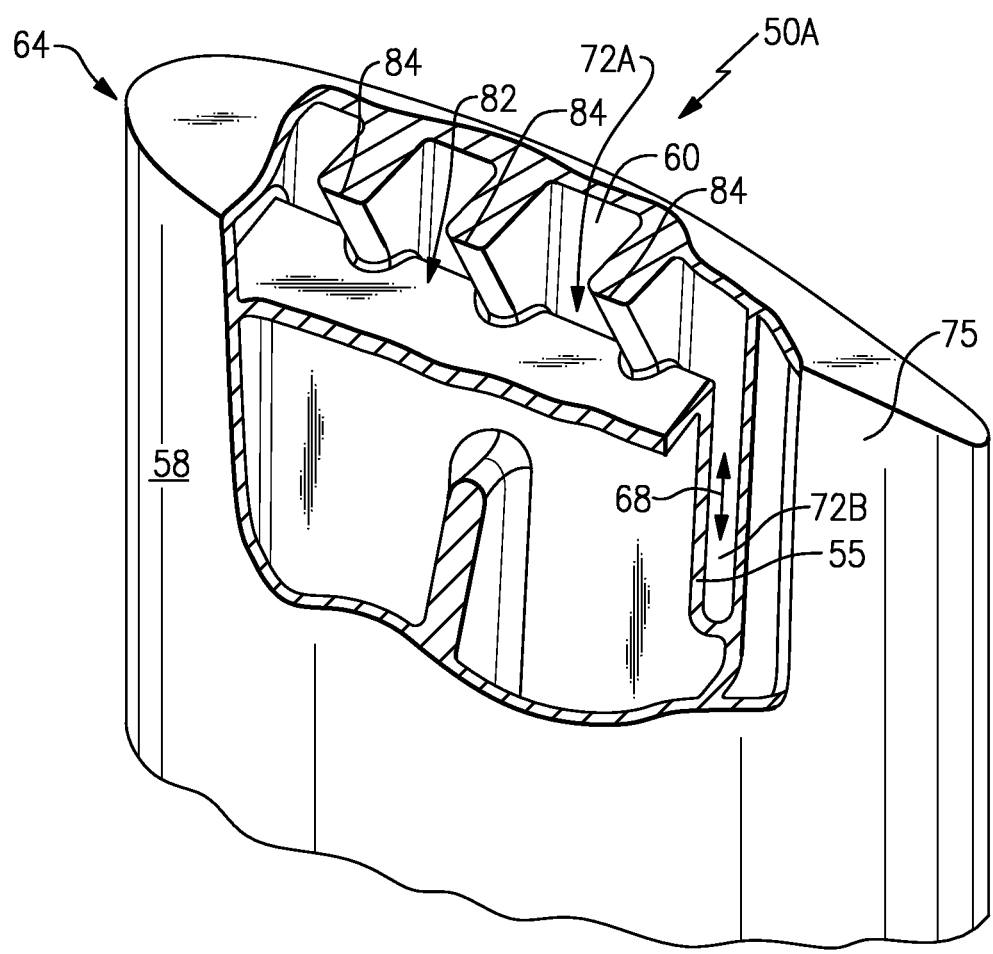
FIG. 4 illustrates a partial cut-away view of a gas turbine engine component.

FIG. 3 illustrates the component 50 (shown in phantom) of FIG. 2 prior to removal of a core assembly 80 (shown in solid) that can be used during a casting or other molding process to define at least a portion of the internal cooling scheme 55 (best illustrated in FIGS. 2 and 4). For example, the component 50 may be cast to include hollow portions that make up the internal cooling scheme 55 that extends inside of the component 50.

The component 50 may be manufactured in a casting process. One exemplary casting process includes the initial step of fabricating the core assembly 80 to include features that define the internal cooling cavities 72 (see FIGS. 2 and 4) and various other passages and features of the internal cooling scheme 55. The core assembly 80 is inserted into a mold or other molding fixture and surrounded by a molten material. The molten material cures and hardens about the core assembly 80 to define the internal and external surfaces of the component 50. Once the molten metal has cured, the core assembly 80 may be removed through known methods, such as leeching, to form a completed component.

Figure 7:
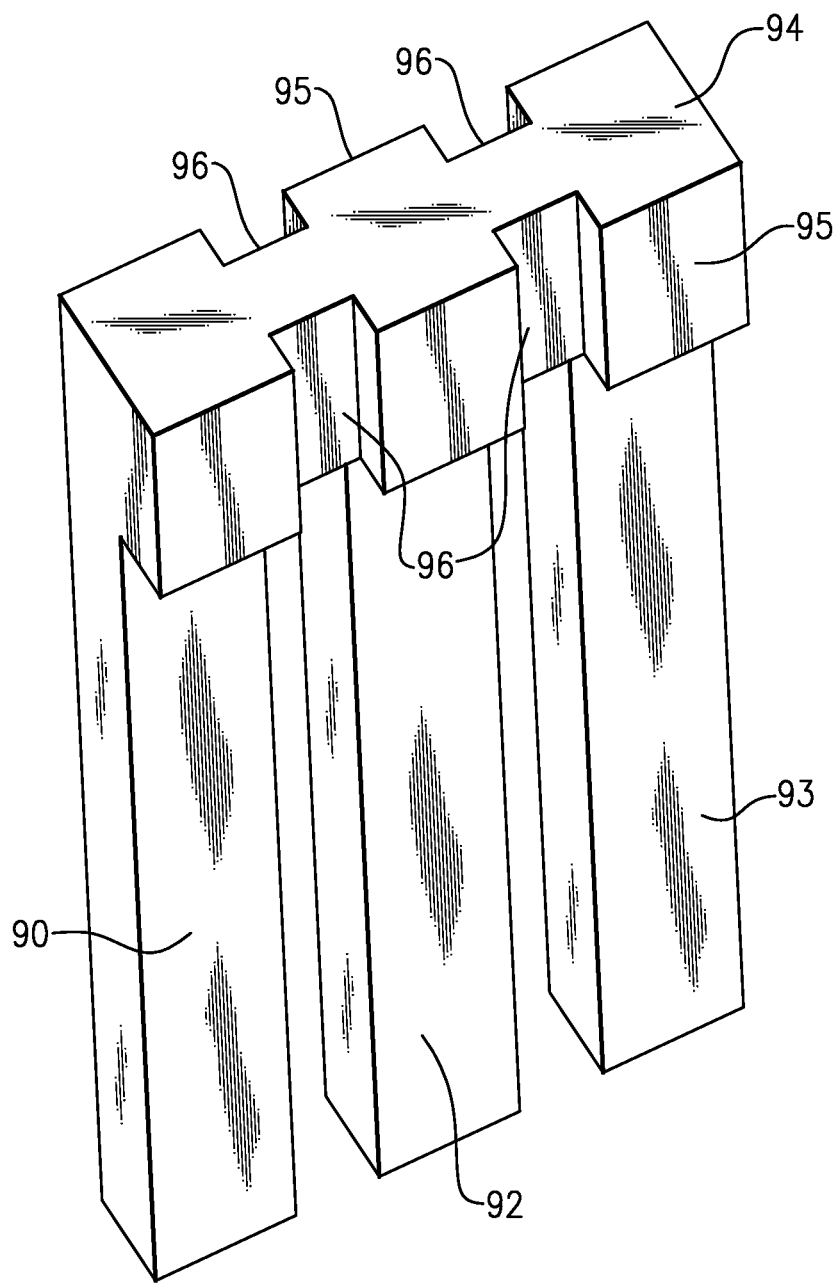
FIG. 7 illustrates an exemplary core assembly.

In one embodiment, the core assembly 80 is a ceramic core. In another embodiment, the core assembly 80 is a refractory metal core (RMC). In another embodiment, the core assembly 80 is a hybrid core (for example, a hybrid of a ceramic core and a RMC core). Other materials are also within the scope of this disclosure. FIG. 3 illustrates but one embodiment of a core assembly 80 that can be used to cast internal features into the component 50. Additional features of the core assembly 80 are described below and are illustrated by FIG. 7. Although not shown, various other core assemblies may be utilized to create additional internal features of the component 50. In addition, the core assembly 80 may be made using any known process, including but not limited to an additive manufacturing process.

FIG. 4 illustrates portions of a completed component 50A. That is, the completed component 50A is illustrated post-cast and post-removal of any core assemblies used to create the internal cooling scheme 55 of the completed component 50A. In one embodiment, the internal cooling scheme 55 of the completed component 50A includes a first cooling cavity 72A, a second cooling cavity 72B and a plenum 82 that extend inside of a body 75 of the completed component 50A. The body 75 may be representative of an airfoil, platform, root or any other section of the completed component 50A. The first cooling cavity 72A and the second cooling cavity 72B extend to the plenum 82 to feed the plenum with a cooling fluid 68.

In one embodiment, the plenum 82 is positioned in the tip 64 of the body 75; however, the plenum 82 could be located elsewhere. In addition, the cooling cavities 72A, 72B and the plenum 82 are not limited to the configuration shown in which the cooling cavities 72A, 72B radially feed the axially disposed plenum 82. For example, the cooling cavities 72A, 72B could axially feed a radially disposed plenum 82 within the scope of this disclosure.

A rib 84 separates the first cooling cavity 72A from the second cooling cavity 72B. In one embodiment, one or more ribs 84 extend into the plenum 82. In this way, the rib(s) 84 structurally supports the transition area between the cooling cavities 72A, 72B and the plenum 82.

In one embodiment, the rib 84 extends from the suction sidewall 60 into the plenum 82. However, the rib 84 could also extend from the pressure sidewall 58 within the scope of this disclosure. The rib 84 may be as thick as the sidewall 58, 60, or could extend further into part of the plenum 82.

Figure 6:
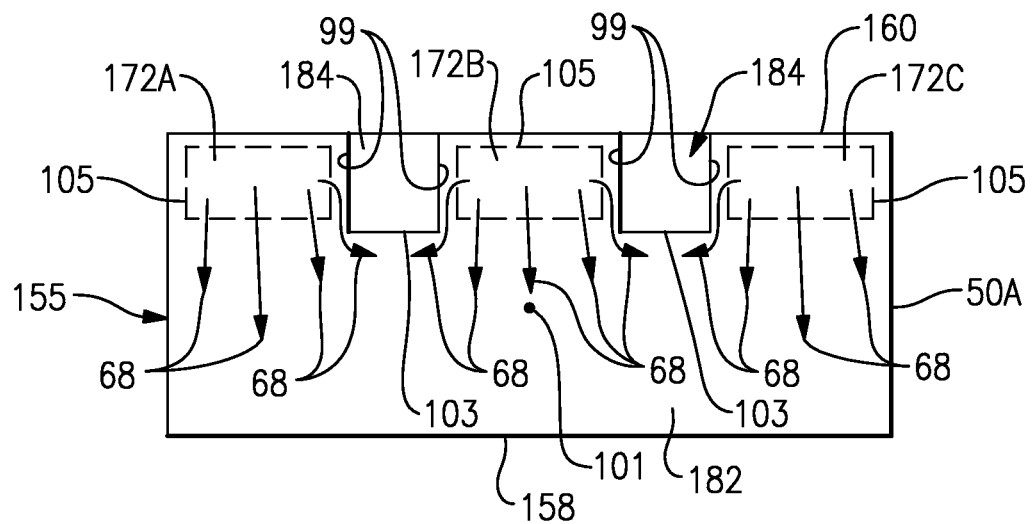
FIG. 6 illustrates a top view of a gas turbine engine component.

In one embodiment, the rib 84 terminates prior to the opposite sidewall 58, 60 (see rib 184 of FIG. 6, for example).

Figure 5:
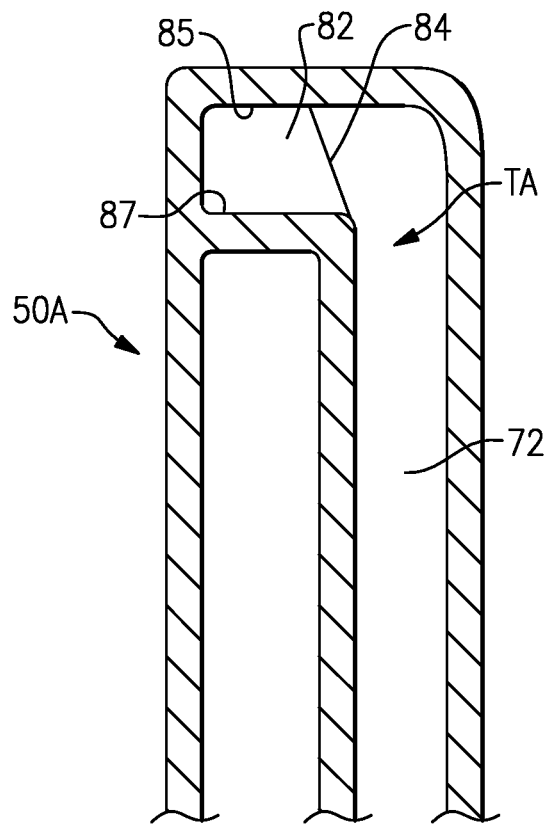
FIG. 5 illustrates a side view of a gas turbine engine component.

As best illustrated by FIG. 5, the rib 84 of a completed component 50A extends between opposing sides 85, 87 of the plenum 82 and holds the plenum 82 together near a transition area TA between a cooling cavity 72 and the plenum 82. In one embodiment, the rib 84 extends transversely between the opposing sides 85, 87 of the plenum 82. The rib 84 may reduce deflections or bulging of the plenum 82 that can occur during engine operation and may reduce the likelihood of the plenum 82 liberating from the component 50.

FIG. 6 illustrate an internal cooling scheme 155 of a completed component 50A. The internal cooling scheme 155 includes a first cooling cavity 172A, a second cooling cavity 172B and a third cooling cavity 172C that merge into a plenum 182. Ribs 184 are positioned between the cooling cavities 172A, 172B and 172C and at least partially extend into the plenum 182. The number and configuration of cooling cavities and ribs is exemplary only and is not intended to limit this disclosure.

The ribs 184 can control the expansion of cooling fluid 68 into the plenum 182. For example, cooling fluid 68 that exits the cooling cavities 172A, 172B and 172C is forced to travel along a surface 99 of the ribs 184 prior to circulating through the plenum 182. Put another way, the ribs 184 increase the amount of area available to perform heat transfer and conduct heat away from the suction sidewall 160 (or pressure sidewall 158) of the completed component 50A by constricting the flow of the cooling fluid 68 in a specific direction (here, a direction toward a center 101 of the completed component 50A).

The ribs 184 may also act as augmentation features that convect heat away from hot surfaces of the suction sidewall 160 and/or the pressure sidewall 158. In one embodiment, the ribs 184 include a face 103 that extends past, or is circumferentially offset from, an outlet 105 of each cooling cavity 172A, 172B and 172C. The surfaces 99 of the rib 184 force the cooling fluid 68 to flow across the face 103, thereby increasing heat transfer.

FIG. 7, with continued reference to FIGS. 1-6, illustrates an exemplary core assembly 80 that can be used to define one or more portions of an internal cooling scheme of a completed component (see, for example, the internal cooing schemes 55, 155 of FIGS. 2, 4 and 6). The exemplary core assembly 80 includes a first passage core 90 that defines a first cooling cavity of a completed airfoil, a second passage core 92 that defines the second cooling cavity of the completed airfoil, a third passage core 93 that can define a third cooling cavity of the completed airfoil, and a partial rib 94 that extends from the passage cores 90, 92 and 93. Although three cores are illustrated, the core assembly 80 could include additional or fewer cores depending on the number of desired cooling cavities.

The partial rib 94 defines a plenum of the completed component. One or more cutouts 96 may be disposed in a face 95 of the partial rib 94. The cutouts 96 define the ribs of a completed component. In one embodiment, the cutouts 96 are disposed on opposing faces 95 of the partial rib 94 in order to cast ribs on both a first sidewall and a second sidewall of the plenum. The core assembly 80 could include additional features.

Although the different non-limiting embodiments are illustrated as having specific components, the embodiments of this disclosure are not limited to those particular combinations. It is possible to use some of the components or

What is claimed is:

1. A component, comprising:
an airfoil that includes a first sidewall and a second sidewall joined together at a leading edge and a trailing edge and extending radially from a base to a tip;
a plenum defined inside said airfoil, and said plenum is positioned in said tip;
a first cooling cavity merging into said plenum;
a second cooling cavity merging into said plenum; and
a rib that extends from said first sidewall at least partially into said plenum to separate said first cooling cavity from said second cooling cavity, wherein said rib extends radially between opposing sides of said plenum such that said first cooling cavity and said second cooling cavity extend along said first sidewall on opposed sides of said rib, said rib extends transversely between said opposing sides, one of said opposite sides defining a floor and another one of said opposing sides bounded by a wall of said tip, a portion of said rib extends from said first sidewall and terminates prior to said second sidewall, and said first and second cooling cavities have respective first and second outlets into said plenum, said first and second outlets both defined along said floor such that said first and second outlets are spaced apart by said rib.

2. The component as recited in claim 1, wherein said component is a blade.

3. The component as recited in claim 1, wherein said component is a vane.

4. The component as recited in claim 1, wherein said rib extends across said plenum.

5. The component as recited in claim 1, wherein said rib defines a surface that constricts a flow of cooling fluid that exits at least one of said first cooling cavity and said second cooling cavity into said plenum.

6. The component as recited in claim 5, wherein said first and second cooling cavities extend radially inward from said rib towards said base.

7. The component as recited in claim 1, comprising a third cooling cavity that merges into said plenum.

8. The component as recited in claim 7, wherein said third cooling cavity exits adjacent to another rib.

9. The component as recited in claim 1, wherein said rib includes a radially extending face that is offset from at least one of said first and second outlets.

10. The component as recited in claim 1, wherein said rib includes a radially extending face that is offset from said first outlet and said second outlet, and said radially extending face opposes one of said first and second sidewalls.

11. The component as recited in claim 10, wherein said radially extending face slopes away from said floor.

12. A gas turbine engine, comprising:
a component disposed in at least one of a compressor section and a turbine section, wherein said component includes a body that includes a first sidewall and a second sidewall joined together at a leading edge and a trailing edge and extending radially from a base to a tip, said component having an internal cooling scheme comprising:
a cooling cavity that merges into a plenum;
a rib that extends from said first sidewall into said plenum to control expansion of a cooling fluid from said cooling cavity into said plenum, wherein said rib extends radially between opposing sides of said plenum such that said cooling cavity extends along said first sidewall, one of said opposing sides defining a floor and another one of said opposing sides bounded by a wall of said tip, said rib extends transversely between said opposing sides, a portion of said rib extends from said first sidewall and terminates prior to said second sidewall, and said cooling cavity has an outlet into said plenum, said outlet defined along said floor.

13. The gas turbine engine as recited in claim 12, wherein said cooling cavity includes a first cooling cavity and a second cooling cavity each merging into said plenum, said first and second cooling cavities separated by said rib, and wherein said outlet includes and outlet of said first cooling cavity and an outlet of said second cooling cavity.

14. The gas turbine engine as recited in claim 13, wherein said outlet of said first cooling cavity and said outlet of said second cooling cavity are spaced apart from said rib.

15. A core assembly for fabricating a component, comprising:
a first core that defines a first cooling cavity of a component;
a second core that defines a second cooling cavity of said component;
a partial rib that extends from said first core and said second core and defines a plenum of said component; and
at least one cut-out in said partial rib that defines a rib in said component, wherein said partial rib extends radially between opposing sides of said plenum such that said first cooling cavity and said second cooling cavity extend along a first sidewall of said component on opposed sides of said partial rib, said partial rib extends transversely between said opposing sides, a portion of said partial rib extends from said first sidewall of said component and terminates prior to a second sidewall of said component, said first core and said second core arranged such that said first and second cooling cavities have respective first and second outlets into said plenum, and said first and second outlets both defined along a common one of said opposing sides such that said first and second outlets are spaced apart by said partial rib.

16. The core assembly as recited in claim 15, wherein said component is a completed component.

17. The core assembly as recited in claim 15, comprising a third core that defines a third cooling cavity of said component.

18. The core assembly as recited in claim 17, wherein said partial rib extends from said third core.

19. The core assembly as recited in claim 15, wherein said at least one cut-out includes a plurality of cut-outs disposed on opposing faces of said partial rib.

* * * * *